United States Patent
Underwood et al.

(10) Patent No.: US 10,824,467 B2
(45) Date of Patent: Nov. 3, 2020

(54) DATA PROCESSING SYSTEM WITH PROTECTED MODE OF OPERATION FOR PROCESSING PROTECTED CONTENT

(71) Applicant: Arm Limited, Cambridge (GB)

(72) Inventors: Mark Underwood, Cambridge (GB); Hakan Lars-Goran Persson, Bjarred (SE)

(73) Assignee: Arm Limited, Cambridge (GB)

( * ) Notice: Subject to any disclaimer, the term of this patent is extended or adjusted under 35 U.S.C. 154(b) by 157 days.

(21) Appl. No.: 16/056,927

(22) Filed: Aug. 7, 2018

(65) Prior Publication Data
US 2020/0050478 A1 Feb. 13, 2020

(51) Int. Cl.
  *G06F 9/455* (2018.01)
  *G06F 9/48* (2006.01)
(52) U.S. Cl.
  CPC .......... *G06F 9/4881* (2013.01); *G06F 9/485* (2013.01); *G06F 9/4812* (2013.01)
(58) Field of Classification Search
  CPC ................................................. G06F 9/4881
  See application file for complete search history.

(56) References Cited

U.S. PATENT DOCUMENTS

| 9,672,162 | B2 | 6/2017 | Persson | |
| 2007/0103476 | A1* | 5/2007 | Huang | G06T 1/20 345/522 |
| 2013/0247061 | A1* | 9/2013 | Kiehn | G06F 9/5044 718/104 |
| 2014/0237609 | A1* | 8/2014 | Sharp | G06F 21/10 726/26 |
| 2015/0052325 | A1* | 2/2015 | Persson | G06F 12/1458 711/163 |

* cited by examiner

*Primary Examiner* — Hang Pan
(74) *Attorney, Agent, or Firm* — Vierra Magen Marcus LLP

(57) ABSTRACT

A data processing system in which a host processor prepares command streams for causing an accelerator of the data processing system to perform processing tasks for an application executing on the host processor, each command stream including a sequence of commands for implementation by the accelerator. When a request for processing includes protected content, the host processor includes within a command for a command stream, an indication that a subsequent sequence of one or more command(s) within that command stream associated with the protected content is to be implemented by the accelerator in a protected mode of operation. Then, when that command is executed, the accelerator initiates or requests a switch into the protected mode of operation.

17 Claims, 7 Drawing Sheets

DATA PROCESSING SYSTEM WITH PROTECTED MODE OF OPERATION FOR PROCESSING PROTECTED CONTENT

BACKGROUND

The technology described herein relates to data processing systems and in particular to achieving protected processing of protected content within data processing systems comprising an accelerator that is operable to perform processing work for a host processor wherein the processing work is specified using one or more command stream(s) prepared by the host processor.

Many data processing systems include processing resources, such as a graphics processing unit (GPU) or a video processor (VPU), which may perform processing work for applications that are executing on a main processor (CPU) of the data processing system. For instance, many electronic devices, such as mobile phones or tablets, will include both a host processor (CPU) that executes an operating system, such as Android, capable of running various applications and one or more accelerators, such as a GPU, that provide hardware support for specific functions. In the case of a mobile phone or tablet, for example, the GPU may be used to generate the user interface that is displayed under the control of the operating system, and to compose the frame that is displayed on the display to the user.

In some modern data processing systems, the submission of processing work for the accelerator is controlled using one or more command stream(s), wherein the accelerator may be caused to perform processing work for applications executing on the host processor by the host processor providing a stream of commands (instructions) specifying the processing work to be performed by the accelerator. Command streams are thus essentially machine code programs that can be executed by a special processor. The accelerator is thus provided with a command stream frontend including a dedicated processing unit, a 'command stream execution unit', for interpreting and implementing these command streams.

A command stream may, for example, contain commands (instructions) to set parameters for processing jobs (which commands may, e.g. be emulated by a supervising controller on the accelerator), as well as commands (instructions) to execute the processing jobs, e.g. using the accelerator hardware units (processing core(s)). The command stream execution unit can then work its way through the command stream, executing the commands (instructions) in the command stream, in turn, and performing, or causing the accelerator hardware to perform, the operations indicated by the commands.

Within such data processing systems, e.g. where an accelerator is controlled to perform desired processing operations by a host processor using one or more command stream(s), there may be various instances where it is desired to achieve more secure processing of protected content. For instance, it is becoming increasingly common for content providers to wish to provide (e.g. stream) protected content, such as videos, to electronic devices (and in particular to mobile devices). To support this, the electronic devices must therefore be able to ensure the security of the protected content when it is, e.g. being played back to a user via the device.

However, existing mechanisms for achieving this may suffer from various drawbacks, and are not generally designed for use within command stream based data processing systems. The Applicants believe therefore that there remains scope for improved mechanisms for the provision of protected content processing in this context, i.e. within data processing systems wherein processing work for an accelerator is specified using one or more command stream(s).

BRIEF DESCRIPTION OF THE DRAWINGS

A number of embodiments of the technology described herein will now be described by way of example only and with reference to the accompanying drawings, in which.

DETAILED DESCRIPTION

Figure 1:
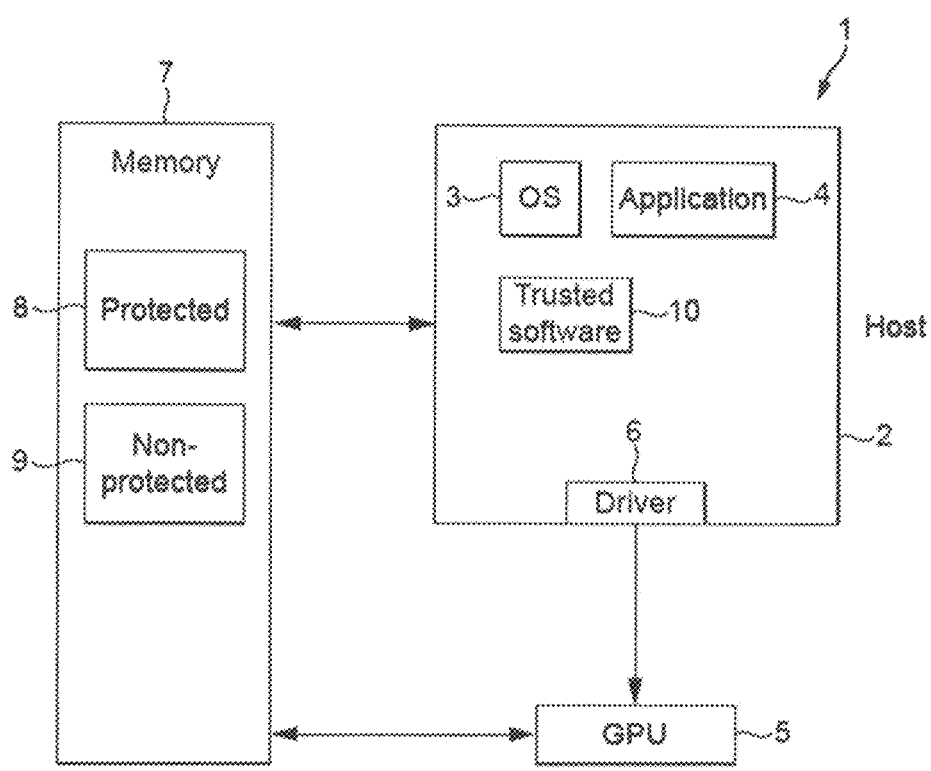
FIG. 1 shows an exemplary graphics processing system of an embodiment of the technology described herein.

An embodiment of the technology described herein comprises a data processing system, the data processing system comprising:

a host processor that executes applications using an operating system;

an accelerator operable to process data for applications executing on the host processor; and memory for storing data for use by the accelerator, the memory having both protected memory and non-protected memory;

wherein the accelerator can be switched between a non-protected mode of operation for processing non-protected content and a protected mode of operation for processing protected content;

wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and wherein the command stream generating circuitry is operable to include within a command for a command stream an indication that a subsequent sequence of one or more command(s) within that command stream is to be implemented by the accelerator in a protected mode of operation so that when that command is executed the accelerator is operable to initiate or request a switch into the protected mode of operation for processing the subsequent sequence of one or more command(s).

Another embodiment of the technology described herein comprises a method of processing data using a data processing system comprising:

a host processor that executes applications using an operating system;

an accelerator operable to process data for applications executing on the host processor; and memory for storing data for use by the accelerator, the memory having both protected memory and non-protected memory;

wherein the accelerator can be switched between a non-protected mode of operation for processing non-protected content and a protected mode of operation for processing protected content;

wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator;

the method comprising:

when a request for processing includes protected content, including within a command for a command stream an indication that a subsequent sequence of one or more command(s) within that command stream associated with the protected content is to be implemented by the accelerator in a protected mode of operation; and when that command is executed by the accelerator, initiating or requesting a switch into the protected mode of operation.

Thus, the technology described herein generally relates to data processing systems comprising an accelerator that is operable to execute a sequence of commands in a command stream provided by a host processor in order to perform processing work for applications executing on the operating system of the host processor. For instance, when a request for processing work by the accelerator is made by an application on the host processor, the host processor can then prepare one or more command stream(s) including a plurality of commands (instructions) specifying the processing work to be performed by the accelerator. The commands (instructions) are then implemented on the accelerator, e.g. using a suitable command stream execution unit under the control of a supervising controller, with the commands being executed in turn in order to perform the desired (requested) processing work.

The accelerator is capable of being switched from its normal (non-protected) mode of operation into a protected mode of operation suitable for processing of protected content. The accelerator in an embodiment has particular memory access restrictions in the protected mode such that the operating system is still able to control processing of (e.g.) protected data by the accelerator, but ensuring that the operating system cannot gain access to the protected data. That is, the data processing system in an embodiment enforces particular memory access restrictions on the accelerator when the accelerator accesses memory in the protected mode. This could then allow, for example, protected video content to still be played (or to keep playing) whilst a graphics processing unit simultaneously displays a user interface notification, e.g. for an incoming call or message.

By implementing a protected operating mode, for example with suitable memory access restrictions and a switching mechanism for switching the accelerator operation into the protected mode, so that any leaking of protected information can be avoided, protected content can then be processed on the accelerator without requiring e.g. the use of a separate secure operating system (which would typically not allow notifications from the normal operating system to be displayed without switching to the normal operating system and suspending or pausing any applications running using the secure operating system).

According to the technology described herein, where the processing work for the accelerator is specified using one or more command stream(s), the switching of the accelerator into the protected mode of operation is triggered (initiated) by including a suitable indication within a command stream indicating that a subsequent sequence of one or more commands within that command stream are to be performed in a protected mode. Thus, the command stream generating circuitry of the host processor is generally operable to, when a request for processing includes (or relates to) protected content, include within a command a suitable indication of this. When that command has been executed, the accelerator thus knows that a switch into the protected mode is desired, and can thus be arranged to switch, or to request to switch, into the protected mode of operation.

In this way, the technology described herein can achieve secure processing of protected content within a command stream based system. A particular advantage of the arrangement of triggering protected mode processing through the inclusion of appropriate indications within the commands of a command stream that is being executed by the accelerator, whereby the switch can be performed or requested in response to executing those commands, is that it can, for example, allow the intermixing and performance of normal and protected work on the accelerator with minimal (or no) intervention from the host processor.

For example, in the case where the host processor and graphics processor synchronise with each other through the use of synchronisation objects stored in shared (non-protected) memory, a command stream that includes protected processing can be switched out of the protected processing mode so as to update the non-protected synchronisation object, and then switched back into the protected mode for further protected processing, and back out of the protected mode to provide a further synchronisation update, and so on, simply by including appropriate instructions in the command stream that is being executed. By contrast, in more conventional (non-command stream based) arrangements, the host processor may need to explicitly write to a hardware register in order to switch the accelerator (e.g. GPU) into, or out of, protected mode. After a switch is complete, the host processor must then (re)configure the accelerator for execution in the new operating mode.

The technology described herein may thus provide a more efficient way for performing processing of protected content on accelerators that operate under a command stream based mechanism. Implementing the switching through the inclusion of appropriate commands within the command stream may also help to better schedule the switching, e.g. to provide faster switching, or to reduce the number of switches required, than may be the case using more conventional (i.e. non-command stream based) arrangements.

For instance, when using a command stream based approach, because the command stream frontend can be capable of behaving similarly in both the protected and normal mode of operation, e.g. because the same command stream instruction set and control interface (e.g. to configure command stream scheduling) may be used in both modes, it is possible to provide improved (faster) switching between and interleaving of protected and normal work, as mentioned above.

The technology described herein may generally be implemented in any suitable data processing system, as desired.

The data processing system is in an embodiment (embedded) in an electronic device, and in an embodiment a portable device, such as a mobile phone, tablet, or the like.

The data processing system comprises a host processor (CPU). The host processor executes an operating system, such as Android. Various applications, such as games, may be executed using the operating system. The data processing system further comprises an accelerator that is operable to process data under the control of the operating system on the host processor. For instance, applications running on the operating system of the host processor may require additional processing resource. The host processor may thus make calls to the accelerator for performing processing work.

The accelerator may be any suitable accelerator that can, e.g., provide a processing resource for the host processor. The accelerator could, for example, comprise a graphics processing unit (GPU) or video decoder, an encryption accelerator, a video accelerator, a network (processing) interface, a digital signal processor (DSP), audio hardware, etc. The accelerator can essentially comprise any component (execution/functional unit) that is optimised for a particular task. The processing that is to be performed by the accelerator can thus be any suitable and desired processing that the accelerator can perform. This will typically depend on the nature of the accelerator. For example, in an embodiment, the accelerator comprises a GPU. In that case, the processing to be performed in an embodiment comprises appropriate graphics processing, such as effects processing, overlay generation, display frame composition, etc.

The data that is to be processed by the accelerator can thus be any desired and suitable data, e.g. depending on the nature of the accelerator. In an embodiment, the data that is to be processed by the accelerator comprises content data, and in an embodiment includes at least some protected content such as DRM (digital rights management) protected data. The data may, e.g. be video and/or audio content.

The data processing system also comprises memory for use by the accelerator. For instance, in embodiments, the memory may store data that is to be used or processed by the accelerator and/or or data that is generated by the accelerator. (The memory is typically also accessible by the host processor, although in an embodiment with certain restrictions, as described below.)

The memory may generally comprise both protected memory (regions) and non-protected memory (regions). That is, the memory may be configurable to have both protected memory that is not readable by the operating system when it is operating in a non-secure mode and non-protected memory that is readable by the operating system when it is operating in a non-secure mode. The protected and non-protected memory (regions) may be implemented as desired, for instance using the existing processes for that of the data processing system in question. Many mobile platforms, for example, will include infrastructure to separate protected (secure) and non-protected (non-secure) memory areas.

According to the technology described herein, in order to handle processing of protected content, the accelerator can be switched between a normal (non-protected) mode of operation and a protected mode of operation. The accelerator in an embodiment has read and write access to data that is stored in non-protected memory regions but no write or write-only access to any protected memory regions in the normal (non-protected) mode of operation, and in an embodiment has read and write access to data that is stored in protected memory regions but only has read-only access to any non-protected memory regions in the protected mode of operation.

The accelerator in an embodiment uses both data stored in protected memory regions and data stored in non-protected regions when operating in its protected processing mode. However, when in the protected mode, particular memory access restrictions are enforced for the accelerator. In particular, the accelerator should and in an embodiment does only have read only access to non-protected memory regions. This prevents the accelerator from writing data into a memory area accessible by the operating system in a non-secure fashion when the accelerator is operating in its protected mode. This can then ensure that the accelerator operation will not cause a risk of leakage of protected data to the operating system. In this way, regardless of the operation the accelerator performs, it cannot transfer information from its protected world to the operating system, thereby removing any reason to restrict the type of operation the accelerator is allowed to perform on protected content, for example.

(It should be noted here that, unlike in more conventional secure operating environments, e.g. as may be implemented using secure (fully trusted) software, such as an Arm TrustZone (or similar) and/or hypervisor software component, in the technology described herein the protected mode of operation is in an embodiment arranged such that the protected "world" only has read-only access to the "normal" world, rather than, as would more conventionally be the case, full access to the normal world.)

However, as the accelerator still has read access to the non-protected memory, the accelerator is able to access any data from that memory (from the normal world) that it may need for its protected mode processing (but without the risk of leakage of protected data into the normal world). This can allow, for example, the accelerator to still use and process data from the non-protected world when operating in its protected processing mode. As mentioned above, this arrangement may thus allow the operating system to still control processing of (e.g.) protected data by the accelerator whilst ensuring that the operating system cannot gain access to the protected data. In this way it is possible, for example, for protected video content to still be provided simultaneously with displays from the normal operating system, e.g. a user interface notification such as for an incoming call or message.

The host processor (CPU) may, and in an embodiment does, have (at least) two operating modes, a normal non-secure operating system mode (e.g. Android) and a secure mode where it runs secure (fully trusted) software, such as an ARM TrustZone (or similar) and/or hypervisor software component, outside the non-secure operating system. The host processor may, and in an embodiment can, access the protected memory regions when it is operating in its secure mode. In its normal, non-secure operating mode, the operating system (and the host processor) may have no access to the protected memory regions. However, in some embodiments, the operating system in its normal mode of operation may have write access (but only write access) to the protected memory regions. This may be advantageous compared to the operating system having no access to the protected memory regions, because it allows the operating system to directly write data structures required by the accelerator in its protected mode operation into the protected memory that the accelerator will use in its protected mode of operation. The host processor can in an embodiment access non-protected memory regions in both its normal, non-secure operating system mode and in its secure mode.

(It should be noted here that unless the context otherwise requires, references herein to a "secure" mode of operation are intended to refer to operation using fully trusted software, references to a "protected" mode of operation are intended to refer to the particular "protected" mode of operation of the accelerator in the manner described herein, and references to a "normal" mode of operation are intended to refer to the ordinary operating system operation of the host processor.)

Thus, when the accelerator is in the protected mode, host processor and accelerator memory access is both restricted, e.g. in consequence so that the accelerator cannot write a register that the host processor can read.

For the data processing systems of the technology described herein, the submission of processing work to the accelerator is controlled using command streams. Processing work for the accelerator can thus be specified by the host processor generating a suitable sequence of commands for implementation by the accelerator. The host processor accordingly comprises suitable command stream generating circuitry operable to prepare, in response to a request for processing to be performed by the accelerator from an application being executed by the host processor using the operating system, one or more command stream(s) to cause the accelerator to perform processing tasks for the application, each command stream including a sequence of commands for implementation by the accelerator. The command stream generating circuitry acts to translate calls for processing from (applications running on) the host processor into a sequence of commands (instructions) for implementation by the accelerator. These instruction sequences, or 'command streams', can then be written to the accelerator for implementation thereby.

The preparation of the command streams by the host processor can be performed by any suitable and desired element and component of the host processor. However, in an embodiment, the command streams are prepared by a driver for the accelerator (which driver accordingly operates in the manner of the technology described herein). Thus in an embodiment, the command stream generating circuitry comprises programmable processing circuitry that can be programmed (e.g. and in an embodiment to operate as a driver for the accelerator) to prepare the command streams in the desired manner.

The command streams can be provided to the accelerator in any suitable and desired manner. For example, they may be stored in appropriate command stream storage, from where the commands can be read appropriately by the accelerator for execution. Other arrangements would, of course, be possible.

In an embodiment, the sequence of commands making up a command stream is stored in an appropriate buffer or buffers. Where plural buffers are used, they are all in an embodiment considered to be part of the same command stream (and share the same register file and other state). In an embodiment, the command sequence for a command stream is at least stored in a main, in an embodiment ring, buffer, but that main buffer can then reference (call), when desired, one or more further, in an embodiment linear, buffers that also store commands for the command stream. In the latter case, the further, e.g. linear, buffers are in an embodiment referenced by call instructions from either the main command (e.g. ring) buffer, or another further, e.g. linear, buffer which itself is eventually called from the main command (e.g. ring) buffer.

The command stream buffers are in an embodiment stored in main (system) memory, but commands therefrom (their contents) can in an embodiment be prefetched/cached (e.g. in local storage of the accelerator) when the command stream is being/is to be executed, to aid execution throughput.

Thus, in response to a request for processing from an application being executed by the host processor using the operating system, the command stream generating circuitry (e.g. which may comprise a driver for the accelerator) may act to generate one or more command stream(s), in respective command stream buffers.

The command stream(s) can then be provided to (made available to) the accelerator for execution.

In order to execute the command streams, the accelerator is in an embodiment provided with suitable command stream execution circuitry (generally referred to herein as a 'command stream frontend'). The command stream frontend (circuitry) may generally comprise one or more command stream interface(s) and a command stream execution unit.

The (and each) command stream interface is in an embodiment operable to cause the accelerator to execute a respective command stream that has been assigned to that command stream interface.

Thus, a (and each) command stream interface can, and in an embodiment does, have associated with it (assigned to it) a command stream buffer storing a sequence of commands (a command stream) to be implemented.

In an embodiment, a command stream interface only references a single command buffer (which is in an embodiment a ring buffer), but as discussed above, in embodiments that buffer can contain calls to one or more other (in an embodiment linear) buffers.

When a command stream is to be prepared and executed, a respective command stream interface is in an embodiment allocated (assigned to) that command stream.

This process in an embodiment comprises first configuring the command stream interface in question to enable it for operation (in an embodiment all the command stream interfaces are disabled after the accelerator is reset). The command stream interface configuration may comprise, for example, setting the accelerator address and size of the (main) command buffer that the command stream interface is to reference, the insert and extract offsets within the buffer, the priority of the command stream interface, etc.

A command stream interface for an application is in an embodiment enabled and configured (e.g., and in an embodiment, by the driver) at application start-up time.

Once a command stream interface has been enabled and configured, then the, e.g. driver, in an embodiment translates the application processing requests (e.g. the API (GLES/CL/Vulkan) requests) to command stream command sequences in the (main) command (e.g. ring) buffer (and any further associated (e.g. linear) buffers that is to be used for that command stream).

Once all the required command sequences for the command stream have been built, then the command stream is in an embodiment made visible to the corresponding command stream interface (e.g. by appropriately "flushing" the work), so that the command stream interface can then start to execute the commands in the command stream (e.g. either immediately or after any still-executing previous command streams have been completed).

Each command stream interface in an embodiment also comprises (has associated with it) a local memory and registry to which state values (parameters) for the processing jobs can be stored. Thus, parameters for processing jobs can be set and stored locally for each command stream interface (e.g. without having to include the state parameters explicitly in the job descriptors provided by the host processor).

The command stream frontend (circuitry) also includes a command stream execution unit for implementing the commands. The command stream execution unit is thus operable to fetch commands from the one or more command buffers (that are currently assigned to a command stream interface) and to then interpret and execute those commands. The instructions within the command buffer(s) are in an embodiment executed in turn (in order) (although the instructions may complete out of order).

In general, any number of command stream interfaces may be provided, as desired. For instance, in some embodiments, a plurality of (e.g. two) command stream interfaces are provided. In such cases, where a plurality of command stream interfaces are provided, the command stream execution unit may, for example, process commands from the respective command buffers in an alternating (e.g. round robin) fashion, at least in the normal mode of operation. (However, other arrangements would of course be possible, and in embodiments, other arrangements are used, especially in the protected mode of operation, e.g. wherein only commands in one of the command buffers are to be performed in protected mode). That is, in an embodiment, where a plurality of command stream interfaces are provided, a shared command stream execution unit is provided for the plurality of command stream interfaces.

The execution of the command streams by the accelerator can be configured and implemented in any suitable and desired manner. For example, the accelerator may, and typically does, include an appropriate supervising controller, such as a microcontroller, that is operable to handle the scheduling of the command streams on the hardware execution resources of the accelerator. The supervising controller, or microcontroller, thus controls the operation of the command stream frontend, including assigning command streams to respective command stream interfaces, etc. The supervising controller is thus able to communicate with the host processor in order to read in new processing work (command streams). In an embodiment the host processor and controller communicate with each other via (shared data structures in) "interface memory" within the normal memory, e.g. with the host processor being operable to send a "doorbell" interrupt to the controller to indicate to the controller to look in the interface memory for new data (work) to do. The controller thus effectively schedules the processing that is performed by the accelerator using the command stream frontend.

Some commands in a command stream will be implemented natively in hardware in the accelerator. Others may be emulated in software by the controller. Thus, when a command in a command stream is executed, e.g. by the command stream execution unit, the instruction (or processing work) associated with that command may be implemented either in hardware or emulated by the controller. This will typically depend on the type of the command that is being executed. For instance, the controller may emulate certain types of instruction, e.g. relating to updating the local registry associated with the command stream interfaces, in order to set the parameters for processing jobs that are to be implemented in hardware. However, the controller is also operable to schedule and provide processing work for the accelerator hardware.

A command stream may, for example, contain commands (instructions) to set parameters for processing jobs, as well as commands (instructions) to execute the processing jobs. A typical sequence of commands for a processing job may thus include an initial sequence of commands for setting the parameters for the processing job, and then a command for performing the processing job.

For example, the command stream may contain a series of 'MOVE' commands for loading parameter values into the local memory or registry associated with that command buffer to initialise or modify the state vector. These commands can be executed in turn by the command stream execution unit in order to set the parameters for the processing job. These types of command are in an embodiment implemented natively, e.g. using appropriate command stream execution unit hardware.

The command stream execution unit is also operable to schedule processing work to be performed by the accelerator hardware. For example, a 'RUN' command may be executed wherein processing work is sent to the accelerator hardware for processing. A RUN command is effectively a processing job but with the initial state (parameters) (in an embodiment) being obtained from the local memory or registry (e.g. rather than being explicitly incorporated as a job descriptor). These commands are thus implemented (natively) in the accelerator hardware.

Other types of commands e.g. that are less frequent, of a more complex nature, that can be expected to have some delay, and/or that may need to wait on an external entity, may be emulated in software by the controller.

The accelerator hardware may typically comprise one or more iterator(s) and one or more (in an embodiment a plurality of) processing core(s). Thus, when processing work is sent to the accelerator hardware, e.g. when executing a RUN command, the processing job may be sent, along with the initial state (parameters), to a respective iterator. An iterator takes the processing job and splits it up into a number of processing tasks which can then be issued to the processing core(s). The iterator can also track the completion of the processing tasks.

In some embodiments, the iterators may be bound to a particular command stream interface. That is, each command stream interface may be associated with, and only able to submit processing jobs to, a particular set of one or more iterators. These bindings can be defined and controlled (dynamically) by the controller.

Thus, in contrast to more conventional (non-command stream based) approaches, the operation of the accelerator is (principally) controlled using the controller, with processing jobs being implemented using local memory and registers on the accelerator, and the host processor can communicate with the controller (e.g. its firmware) through shared memory (e.g. rather than the host processor directly controlling the accelerator by explicitly writing to hardware registers, as in more conventional non-command stream based approaches).

In general, any desired number of commands streams can be prepared for the accelerator. In some embodiments, (at least) two command streams are prepared. Each command stream may relate to any suitable and desired processing work. Where multiple command streams are prepared, each command stream may relate to a different type of processing task.

For example, in the case of a graphics processor, one (or more) command stream may relate to compute tasks for the graphics processor (such as tessellation compute tasks), with the other (or another) command stream (or streams) relating to non-compute tasks (such as geometry tasks). As other examples, the processing tasks may include pilot and other, non-pilot, shader tasks for the graphics processor.

However, in other embodiments, the command streams may relate to processing tasks of the same type. For example, in the case of a graphics processor, this may particularly be the case, when performing interleaved rendering, in which case there may be plural command streams each including respective rendering tasks, but relating to, e.g., different rendering passes of the sequence of rendering passes to be performed for the interleaved rendering operation. However, other examples are also possible.

Each command stream should, and in an embodiment does, include one or more, and in an embodiment plural, commands (instructions). The command streams can include any suitable and desired commands (instructions) to cause the accelerator to perform the desired processing tasks, e.g., and in an embodiment, in accordance with the command stream operation of the data processing system and accelerator in question. Thus the command streams in an embodiment can, and in an embodiment do, include one or more or all of: commands (instructions) to set parameters for processing tasks, commands (instructions) to execute the processing tasks, commands (instructions) to wait for the completion of a processing task, etc.

The accelerator will execute commands in the command streams in turn (and in order), and as it does so may, for a (and for each) command stream that it is executing, track its progress through (along) the command stream (the position that it has currently reached in the command stream), for example, and in an embodiment, by maintaining a progress count for the command stream that is (in an embodiment) automatically incremented when command stream commands that are to increment the progress counter are executed. The current command stream position (progress count) could, e.g., be maintained in an appropriate register of or accessible to the accelerator. In this way, it is possible to track the completion of processing work being performed by the accelerator.

According to the technology described herein, in order to implement the switching of the accelerator into a protected mode of operation, as described above, an indication that a subsequent sequence of one or more commands are to be performed in a protected mode can be included within a command (stream). Thus, the command stream generating circuitry of the host processor is operable to, when a request for processing includes (or relates to) protected content, include within a command for command stream a suitable indication that a subsequent sequence of one or more commands are to be performed in a protected mode.

That is, according to the technology described herein, secure processing of protected content can be achieved by including in a command stream to be executed by an accelerator (e.g. a GPU), an indication that the next sequence (region) of instructions in the command stream should be executed in a protected mode to enable the accelerator to then be switched into the protected mode.

In embodiments, the indication is provided by a command within the command stream. In other words, a 'protected region' instruction can be introduced into a command stream in order to identify (regions or sequences of) commands that are associated with protected content and that therefore should be performed in the protected mode, and to allow the accelerator to be switched into this protected mode accordingly.

For example, the command may indicate explicitly that the next "n" instructions in the command stream are to be executed in protected mode. However, in other examples, the command may indicate (only) the start of a protected mode sequence (region) in the command stream, for instance, the command may indicate that protected mode should be used, e.g. at least for the next instruction. In this case, a further command indicating the end of the protected sequence (region) may thus also be included in the command stream. Various other arrangements would of course be possible. For instance, in some embodiments, rather than providing the indication as a separate command, an indication may be provided as part of another command, e.g. as a modifier thereof.

In response to identifying such an indication in a command stream that is being executed, the command stream execution unit of the accelerator (e.g. GPU) can then indicate that fact to the controller (as this type of instruction will typically be emulated in software on the controller), with the controller then subsequently switching the accelerator into its protected mode of operation and triggering the execution of the indicated instructions in the command stream in the protected sequence (region) whilst the accelerator is in the protected mode operation. Thus, when a command including an indication that a subsequent sequence of one or more commands is to be performed in a protected mode is executed, the accelerator may then be switched into the protected mode.

The switch into the protected mode of operation could be done by the controller itself, or the controller could, e.g., indicate to the host processor that protected mode execution is required, and then await a response from the host processor (CPU) requesting/allowing the switch to protected mode.

The latter would allow the host to control when the protected mode execution is performed. (For example, the host could wait until a certain number of command streams requiring a protected mode operation are present before switching the accelerator into the protected mode of operation, when desired.) So, in some cases, the switching may be controlled by the host processor. For instance, when a command including an indication that a subsequent sequence of one or more commands are to be performed in a protected mode is executed by the accelerator, a request for switching can then sent to the host processor. The host processor can then act on this request to schedule to switch the accelerator into the protected mode.

Thus, in embodiments, when a command including an indication that a subsequent sequence of one or more command(s) are to be implemented by the accelerator in a protected mode of operation is executed, the accelerator signals to the host processor that a switch into a protected mode of operation is desired, and the host processor then causes the accelerator to switch into the protected mode of operation. After the accelerator is switched into the protected mode of operation, the accelerator can then implement the indicated sequence of one or more command(s) whilst in the protected mode.

In an embodiment, the host can decide on a per-command stream basis whether a command stream interface with a pending protected mode request is allowed to run in protected mode. This would then allow the host to request a switch of the accelerator to protected mode, but without all the command streams with protected mode requests pending then running in the protected mode (e.g. so as to select, e.g., only the command streams from the highest priority process to run in protected mode).

Thus, in an embodiment, in the case where there are plural command streams with protected mode requests, the host can in an embodiment permit only some but not all (only selected) ones of those command streams with protected mode requests to run in the protected mode when the accelerator is switched to the protected mode.

On the other hand, having the controller automatically make the switch into protected mode may conversely be advantageous by reducing the likelihood of bubbles in the execution due to long host interrupt request latencies. Accordingly, in other embodiments, when a command including an indication that a subsequent sequence of one or more command(s) are to be implemented by the accelerator in a protected mode of operation is executed, the accelerator itself (and in an embodiment automatically) (and without host intervention) performs the switch into the protected mode of operation.

As discussed above, in an embodiment, the controller/host can select one or only some but not all, of the command streams with protected mode requests to run in the protected mode when switching the accelerator into the protected mode.

The controller/host can delay the switch to protected mode, e.g. wait until there are plural pieces of work to do in protected mode and/or wait for a default time period (as there will still be some cost to switching to protected mode, so there may be a desire to reduce the number of times that that cost is incurred).

Execution of the command stream that includes the protected mode region is halted until the switch into the protected mode takes place. That is, when a command indicating a protected sequence (region) is executed, the execution of the command stream including that command (which is currently being executed in the normal mode) is stopped. The current state can then be saved into a suitable (normal mode) suspend buffer, e.g. to allow the execution to be subsequently resumed. The state of the controller (firmware) (that relates to the command stream (interface) that is being suspended) at this point may also be saved.

The accelerator is in an embodiment switched entirely into protected mode or non-protected mode (reset). That is, the switching is in an embodiment performed 'globally' so that execution of all of the command streams in the normal mode is stopped before switching to protected mode (and vice versa). That is, prior to switching the accelerator into protected mode, the, e.g. controller, in an embodiment also suspends any existing command streams that are being executed on the accelerator and, e.g. and in an embodiment, stores any required state for those existing command streams, e.g. in a non-protected mode suspend buffer, so that they can be resumed once the protected mode processing has been completed.

Correspondingly, the controller in an embodiment builds the necessary data structures and data (a protected mode execution "package") for the protected mode execution. The protected mode execution "package" describes the work to be done in protected mode. For instance, the protected mode work package may indicate, e.g., the address in non-protected memory where the command buffer that is to be executed in protected mode is stored, and/or the size of the portion of the command buffer that is to be executed in protected mode. The command buffer in an embodiment resides in normal (non-protected) memory.

In an embodiment, the protected mode work package also indicates the address in protected memory where the protected data to be processed and/or used in the protected mode is stored, such as the protected content along with e.g. the protected suspend buffer (as discussed below) and other protected mode private data.

As the protected mode execution "package" does not itself contain "protected" information (data), it can thus be saved to non-protected memory (so that it can still be read by the accelerator during the protected mode, but cannot be written to or modified). The protected mode execution "package" can thus be created before (or whilst) the accelerator is configured for the protected mode operation.

Thus, in embodiments, when a command including an indication that a subsequent sequence of one or more command(s) are to be implemented by the accelerator in a protected mode of operation is executed, the accelerator stops execution of at least the command stream including that command, and creates a protected mode work package describing the section of the command stream to be executed in protected mode, wherein the protected mode work package is written to non-protected memory.

In an embodiment, when the command indicating that a subsequent sequence of one or more command(s) are to be implemented by the accelerator in a protected mode of operation is executed, the execution of all pending command steams is stopped. When the execution of a command stream is stopped, a current hardware and/or firmware state is in an embodiment saved, e.g. to a suitable suspend buffer.

In embodiments, when the accelerator is switched into the protected mode, the accelerator is thus able to read the protected mode work package(s) stored in the non-protected memory to identify the work to be performed in the protected mode, and to then perform the work whilst in the protected mode.

Once the accelerator has been configured for, and enters, the protected mode, it executes the commands in the command stream or streams that include a protected region, using the information in the protected mode execution "package(s)" that has/have been prepared for that execution. (Once the controller enters the protected mode, it runs protected firmware which finds the protected work package (s) to execute.)

When the accelerator is operating in protected mode, the command stream frontend controller executes inside the protected mode, so that it has visibility of the accelerator internal state.

In an embodiment there is also a restriction on communication from the command stream frontend controller to the host processor (e.g. it cannot write to a register that the host processor can read). However some communication from the host processor to command stream frontend controller is (in an embodiment) still possible so that host processor can submit requests to the command stream frontend controller (e.g. to change priority of command streams and force the protected mode execution to be suspended). In particular, while the accelerator is operating in protected mode, the host processor can (in an embodiment) continue to work with the command stream frontend interface, such as enqueuing more work, changing command stream priority or other settings. Thus, while the accelerator is in protected mode, the host processor can in an embodiment still build up work and do some operations. Correspondingly, the accelerator in an embodiment can still read normal memory while in protected mode and can get interrupted by the host.

In an embodiment the host processor is able to submit requests to the accelerator while the accelerator is operating in protected mode. This is in an embodiment done by sending a "doorbell" interrupt signal to the accelerator to indicate that a request has been made.

However the accelerator will in an embodiment act on (respond to) particular host requests only until normal mode operation resumes. In particular, the controller can in an embodiment (at least) still check "doorbell" interrupts, e.g. indicating new work (e.g.) in the interface memory when operating in protected mode, but will then determine the (type of) request the doorbell interrupt relates to and only act on (respond to) particular host requests until normal mode operation resumes.

Thus, in an embodiment, when operating in protected mode, the controller can, and in an embodiment does, in response to a doorbell interrupt, check the request from the host that the doorbell interrupt relates to, but will then only act on (respond to) particular requests (and not all requests) that the host can make. In an embodiment, requests to change settings which might impact scheduling of hardware resources by the controller are in an embodiment acted on (responded to) while the accelerator is operating in protected mode, but other types of request are not acted on (responded to).

In an embodiment, the controller is operable to act on (to respond to) one or more of, and in an embodiment all of, the following requests while the accelerator is operating in protected mode: state command stream interface/group changes (e.g. start, stop, suspend, resume, terminate); command stream group priority changes; global configuration changes (such as changing which processing cores are permitted to be used); and new work on higher priority command stream interfaces/groups.

In an embodiment, the host processor can, and the accelerator will respond to, pre-empt protected mode processing when the accelerator is in the protected mode, for example when a higher priority command stream needs to be executed.

Where the accelerator responds to (acts on) a (new) request from the host when the accelerator is operating in the protected mode, the accelerator in an embodiment suspends the protected mode processing that it is doing and stores out any required state so as to be able to resume that processing in a protected suspend buffer (thus this will be the normal suspend buffer operation, but with the relevant state data stored in a "protected" suspend buffer in protected memory). Then, when the accelerator enters the protected mode again, any suspended protected mode command streams can be resumed, based on the information in the protected suspend buffers, as appropriate, and when desired.

The protected mode suspend buffer should not be accessible by the host processor. Thus, the protected mode suspend buffer isn't readable/writable in normal mode (but is readable/writable in protected mode). In this way, the protected mode processing can be suspended, and the states stored to allow the protected mode processing to subsequently be resumed, without risking leaking any protected content.

Once the desired protected mode processing has been completed, the accelerator is then switched back to the normal mode of operation. This is in an embodiment done automatically when all the (active) command streams with pending protected instruction regions have completed their protected instruction regions. That is, at least in some embodiments, the accelerator may be capable of automatically switching out of the protected mode when all protected processing work has been successfully completed. Thus in an embodiment there is no need for the host processor to be involved in the switch-back of the accelerator to normal mode (which may introduce latency bubbles). However, in some cases, it may be desired to have the host processor control the switching back.

In an embodiment, the accelerator can make a status report relating to the protected mode processing. In an embodiment, the accelerator can only make a limited status report. For instance, in an embodiment, the status that can be reported is limited to OK/ERROR/INCOMPLETE as a global indication, i.e. for all the command streams that are being executed in the protected mode (rather than for each command stream individually). This may simplify the status and control processes and may also reduce the potential data leakage rate (by reducing the number of bits of controllable information the controller can use to pass data from protected to non-protected mode for every protected mode switch).

If all the protected command streams execute satisfactorily and completely, then an OK status is returned. If any one of the command streams fails in its protected execution, then a ERROR status is returned and all the command streams (if there is more than one) are assumed to have failed (that is there is no attempt made to identify which particular command stream has failed—this may have the effect of meaning that when more than one command stream is going to be executed in the protected mode in parallel, then the number and type of command streams that are being executed should be selected such that it is perhaps less likely that only one command stream will fail with the others succeeding (e.g. such that any failure of a command stream executing in a protected mode is likely to apply to all the command streams so that one command stream is not more likely to fail thereby detrimentally affecting the results of other command streams)). The INCOMPLETE status is used to indicate that the protected execution of the command stream(s) was suspended, e.g. in the event that the protected processing was interrupted due to a request from the host processor (as discussed elsewhere) (and as distinct from the execution failing).

The status report could also be done per command stream, when desired. The status report is stored in a state register whose contents survive across the resetting of the accelerator (i.e. the switch back into the normal mode).

In another embodiment, the status reports may be limited to OK/FAIL (i.e. where there is no INCOMPLETE status). In this case, in the event that the host processor issues a suspend or interrupt request for a command stream while the accelerator is operating in the protected mode, the status of the protected mode execution will be indicated as FAIL, and the controller (firmware) may be capable of tracking that a suspend request was issued during protected mode execution and to then set the protected mode required flags again at the appropriate time. Again, in this case, the status is in an embodiment reported globally, e.g. once per cycle of protected mode processing, although other arrangements are of course possible.

Thus, in embodiments, when the accelerator is operating in the protected mode, the accelerator is operable to report a success status when all of the work scheduled to be processed in the protected mode is complete, and to report a failure status when any of the scheduled protected work did not successfully complete.

In some cases, the accelerator may be operable to only report either a success or a failure status. When the accelerator is operating in the protected mode, the host processor may be able to interrupt the protected processing and cause the accelerator to switch back into the normal mode of operation. Thus, at least in some embodiments, the accelerator is also operable to report a suspended status when the processing of any of the protected work is interrupted due to a request from the host processor.

In the event that a suspended status is reported, the accelerator may be operable to suspend the protected processing and save the current state to a suspend buffer for the protected mode. For instance, the current hardware and/or firmware state for that instance of protected processing may be saved to a suitable suspend buffer for the protected mode. The current state can then be fetched from the suspend buffer during the next instance of protected processing and used to resume the processing. The suspend buffer for the protected mode should only be readable in the protected mode. That is, separate suspend buffers should be provided for saving the internal states for the protected mode and the normal (non-protected) mode.

The technology described herein also extends to a host processor for use within a data processing system substantially as described herein. Thus, a further embodiment comprises a host processor for use within a data processing system substantially as described herein, the host processor executing applications using an operating system, and comprising command stream generating circuitry operable to prepare, in response to a request for processing to be performed by an accelerator from an application being executed by the host processor, one or more command stream(s) specifying one or more processing tasks to be performed by an accelerator, wherein in response to a request for processing relating to protected content, the command stream generating circuitry includes within a command stream a command indicating that a subsequent sequence of one or more command(s) is to be implemented by the accelerator in a protected mode of operation.

Correspondingly, another embodiment comprises an accelerator for use within a data processing system substantially as described herein, the accelerator comprising command stream executing circuitry comprising:

one or more command stream interface(s) to which respective command streams can be assigned; and a command stream execution unit for implementing commands in command stream(s) assigned to the command stream interface(s);

wherein when a command stream generated by a host processor is to be executed by the accelerator, the command stream is assigned to a respective command stream interface, and the sequence of commands within the command stream is then executed by the command stream execution unit, wherein in response to the command stream execution unit executing a command indicating that a subsequent sequence of one or more command(s) is to be implemented by the accelerator in a protected mode of operation, the accelerator then switches or requests a switch into the protected mode of operation.

As described above, the accelerator may, and typically will, include a supervising controller, such as a microcontroller, that schedules the processing of the command streams. The accelerator will also typically comprise accelerator hardware such as one or more iterator(s) and processing core(s).

Also, as discussed above, each command stream interface in an embodiment has an associated command buffer (which may be made up of a single buffer or a plurality of buffers) in which the commands in a command stream assigned to the command stream interface can be stored, with the command stream execution unit then implementing the commands in the command buffer assigned to the command stream interface.

In an embodiment, the data processing apparatus and/or system (e.g. graphics processing system) comprises, and/or is in communication with, one or more memories and/or memory devices that store the data described herein, and/or that store software for performing the processes described herein. The data processing apparatus and/or system may also be in communication with a host microprocessor, and/or with a display for displaying images based on the output of the data, e.g. graphics, processing system.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

It will also be appreciated by those skilled in the art that all of the described embodiments of the technology described herein can, in embodiments, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program comprising computer software code for performing the methods herein described when the program is run on a data processor, and a computer program comprising software code portions for performing all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with the data processor the processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described in the context of a graphics processing unit processing protected video content in a data processing system. However, it will be appreciated that the technology described herein may generally find utility in any command stream based data processing systems where it is desired to achieve protected processing of content.

FIG. 1 shows an exemplary data processing system 1 that may, for instance, comprise an embedded data processing system for use, for example, in a portable electronic device, such as a mobile phone or tablet. The data processing system includes a host processor (CPU) 2 on which an operating system (OS) 3, and one or more applications 4 may execute. A fully trusted secure software component 10 (e.g. hypervisor, Arm TrustZone or similar) may also execute on the host processor 2. The host processor 2 may thus generally have two operating modes, a "normal", non-secure operating system mode (e.g. Android), and a secure mode where it runs other secure software, such as Arm TrustZone and/or a hypervisor component outside the non-secure operating system.

The data processing system also includes an associated graphics processing unit (GPU) 5 that can perform graphics processing operations for the applications 4 and the operating system 3 executing on the host processor 2. To facilitate this, the host processor 2 also executes a driver 6 for the GPU 5. For instance, an application 4 such as a game executing on the host processor 2 may various require graphics processing operations to be performed by the GPU 5. To do this, the application will generate API (Application Programming Interface) calls that are interpreted by the driver 6 to generate appropriate commands for the GPU 5 to generate the graphics output required by the application 4.

Particularly, the driver 6 is operable to generate a set of "commands" to be provided to the GPU 5 in response to requests from the application 4 running on the host processor 2 for graphics output (e.g. to generate a frame to be displayed). In the present embodiments, the appropriate commands and data for performing the processing tasks required by the application 4 are provided to the GPU 5 in the form of one or more command stream(s), that each include a sequence of commands (instructions) for causing the graphics processor to perform desired processing tasks.

The command streams are prepared by the driver 6 on the host processor 2 and may, for example, be stored in appropriate command stream buffers, from where they can then be read into the GPU 5 for execution. Each command stream may contain commands (instructions) to set parameters for graphics processor tasks, as well as commands (instructions) to execute a task, etc.

Figure 2:
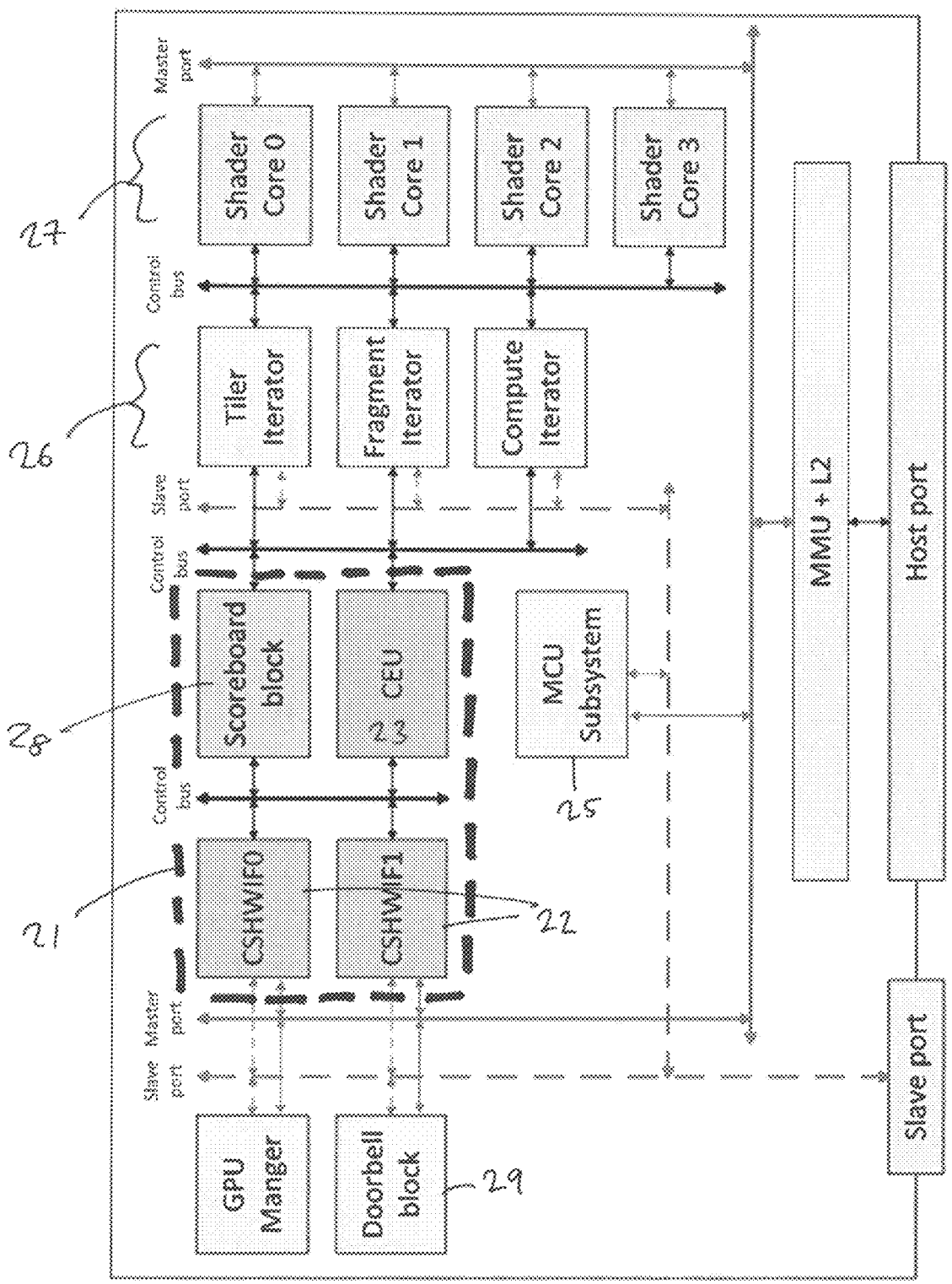
FIG. 2 shows schematically in more detail a graphics processor (including a command stream frontend) that can be operated in the manner of the technology described herein.

The GPU 5 thus includes a command stream frontend for receiving and interpreting these command streams and to control job submission for the GPU 5. FIG. 2 shows in more detail the GPU 5 including the command stream frontend 21. The command stream frontend 21 is generally operated under the control of a supervising microprocessor (MCU) 25, which handles communications with the host processor 2, and schedules the processing of active command streams on the command stream frontend 21.

The command stream frontend 21, which may be implemented as a single (hardware) functional unit, generally comprises one or more command stream interfaces 22 and a (shared) command stream execution unit 23. Each command stream interface 22 has an associated linear (or ring) command buffer containing a set of active instructions to be processed, as well as a registry and local memory for storing the internal state (parameters) for the processing. The command buffer is contained in system memory with the command stream interface containing its properties so it can obtain commands from it.

The instructions within the command buffer(s) can then be provided to the command stream execution unit 23 and then executed in turn (e.g. in a round robin fashion where multiple command stream interfaces 22 are provided). The command stream execution unit 23 thus executes the commands in turn, with the instructions either being emulated in software by the MCU 25, or assigned to the accelerator hardware, e.g. depending on the type of instruction.

(In general when the command stream execution unit 23 executes an instruction, it will either perform the operation synchronously itself (e.g. a move operation), or it will "package up" a request and send it to the accelerator hardware (e.g. a run command), or it will inform the supervising MCU 25, which may then emulate the command in software.)

The command stream frontend 21 also includes a scoreboard block 28 that is able to independently track the processing job completion for each of the command steam interfaces 22. The scoreboard block 28 is thus a shared resource. The scoreboard block 28 tracks the progress of the processing tasks associated with each processing job and reports this back.

As shown in FIG. 2, the accelerator hardware may typically comprise a plurality of iterators 26 (here, separate tiler, fragment and compute iterators are provided, although other arrangements would of course be possible) and processing (e.g. shader) cores 27. A processing job specified in a command being executed by the command stream execution unit 23 can thus be assigned and sent to a respective iterator 26, along with the current parameters held within the registry and local memory. The iterator 26 acts to break down the processing job into a set of processing tasks which can then be distributed between the processing cores 27 for processing.

The host processor 2 communicates with the MCU 25 of the GPU 5 via a shared interface memory (which may be main memory, or another suitable memory cache, depending on the configuration). Thus, when an application 4 running on the host processor 2 makes a call for processing by the GPU 5, the host processor 2 can communicate with the MCU 25 of the GPU 5 via the shared memory, and the MCU can then read the data in from the shared memory. For instance, the host processor 2 can write to a doorbell block 29 to interrupt the current operation of the MCU 25 and cause the MCU 25 to handle new work.

Once the MCU 25 receives a request from the host processor 2 to execute a command stream, the MCU 25 can then assign a respective command stream interface 22 for the command stream, and the command stream properties can then be written to the assigned interface. The commands are then passed in order from the command buffer to a command stream execution unit 23 which interprets the commands from the command buffers, and executes the commands using the local memory and registry information associated with that command buffer.

When a command is executed by the command stream execution unit 23, depending on the type of instruction, the instruction may then be performed either in hardware (e.g. by the command stream execution unit 23 itself, or using the iterators 26 and shader cores 27), or may be emulated by the MCU 25. For instance, any commands e.g. for updating the local memory and registry information may typically be implemented by the command stream execution unit 23 itself in order to set the parameters for a processing job. The processing job may then be sent to the accelerator hardware for processing, along with these parameters.

Figure 3:
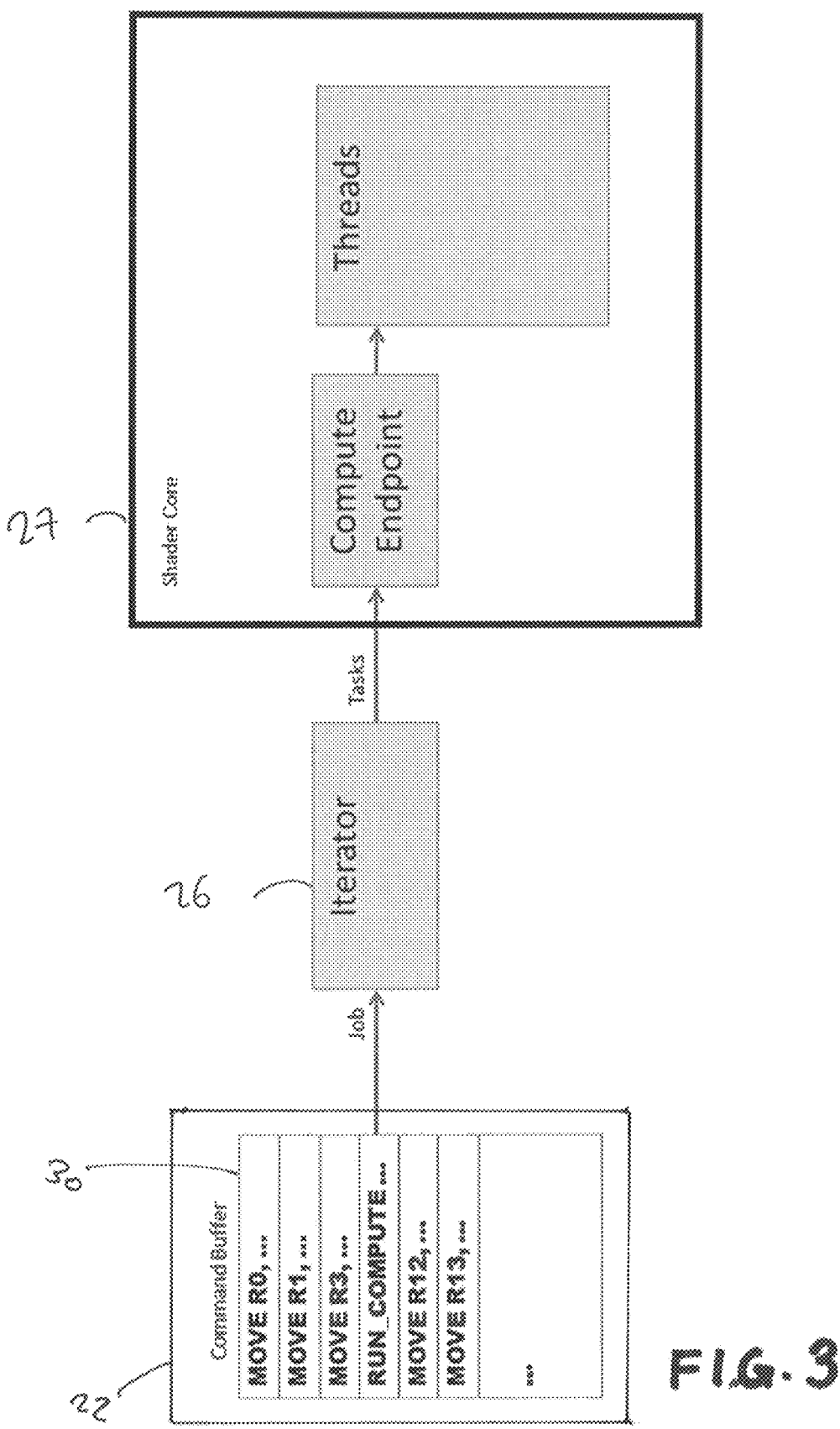
FIG. 3 shows schematically how a command stream may be executed using a graphics processor like that shown in FIG. 2.

FIG. 3 illustrates the execution of a command buffer within a system like that shown in FIG. 2. The command buffer 30 includes a sequence of instructions of different types, including e.g. 'MOVE' and 'RUN' commands. The MOVE commands, for example, load constants into local memory or registry on the command stream interfaces in order to initialise or modify the state vectors for a processing job. The 'RUN' command then sends the state vector to an iterator to start the processing job iteration. Various other types of commands may also be used, for instance, a 'LOAD' command may be implemented to bulk read from/ write to system memory. A 'WAIT' command may also be implemented to cause the processing to wait for the completion of any asynchronous (e.g. RUN or LOAD) commands.

MOVE commands will be implemented within the command stream execution 23. LOAD and WAIT commands (and also "synchronisation" commands) will typically be emulated in firmware by the MCU 25.

The RUN commands are implemented in the external hardware. Thus, as shown in FIG. 3, when a RUN command is executed, a processing job is then sent to the respective iterator 26 (along with the state vector whose value has been initialised in the previous commands). The iterator 26 then breaks the processing jobs into smaller processing tasks which are then issued to the shader core(s) 27. Each shader core may comprise an endpoint that is able to take a task and issue it to the thread groups within the shader core. The iterators 26 may be bound to a particular command stream interface 22 before starting an asynchronous command.

The technology described herein is particularly concerned with handling protected content with such systems. For instance, as shown in FIG. 1, the GPU 5 and host processor 2 both have access to memory 7 where the data they are processing may be stored. The memory can be configured as protected 8 or non-protected 9 memory regions. The protected memory regions 8 are not readable by the host processor (and thus operating system) when it is operating in a non-secure mode of operation. The protected memory regions 8 may be implemented and configured as desired, for example in the normal manner for the data processing system in question. In order to handle protected content, according to the technology described herein, the GPU 5 may be switched into a protected mode of operation having certain memory restrictions, wherein in the protected mode of operation the GPU 5 has read and write access to the protected memory but only has read-only access to the non-protected memory.

In order to initiate a switch into protected mode, when it is desired to process protected content, a protected region (TROT REGION') instruction can be included within a command stream that indicates that the next set of "n" instructions in the command buffer should execute in protected mode. The instruction may explicitly indicate the size of the protected region. Alternatively, it is contemplated a (TROT REGION START') instruction indicating the start of a protected region (and correspondingly a TROT REGION END' instruction indicating the end of the protected region), could instead by included into the command stream. Various other arrangements would of course also be possible. These "protected" processing instructions are, in the present embodiments, emulated in software by the MCU 25.

Figure 4:
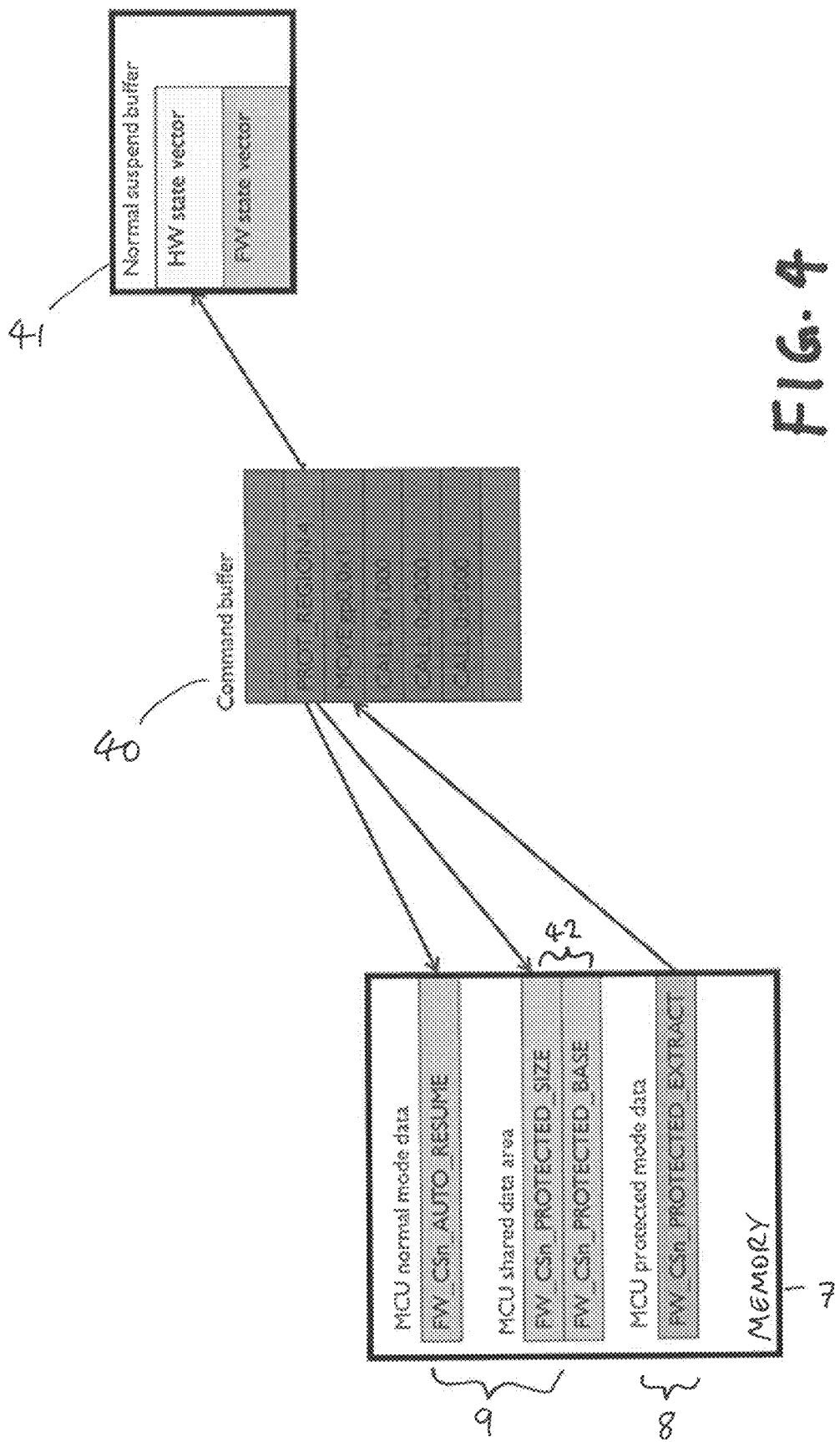
FIG. 4 shows schematically how the graphics processor may be capable of switching into a protected mode for processing protected content in embodiments of the technology described herein.

An example of this is illustrated in FIG. 4. In FIG. 4, a command buffer 40 including a PROT_REGION instruction is currently being executed. The GPU is initially in the normal mode. When the PROT_REGION instruction is executed, the execution is halted until the protected mode has been entered, and the current state vectors (for both hardware and firmware) are saved to a normal suspend buffer 41 (to allow the processing to be resumed once the protected mode processing has finished). At this point, a protected mode data package 42 is generated and written to a portion of shared (non-protected) memory 9. Once the GPU has been configured for protected mode processing, the command buffer then proceeds to execute the commands in the protected mode, reading (and/or writing) the relevant data, as specified in the protected mode data package 42, into protected memory 8.

Figure 5:
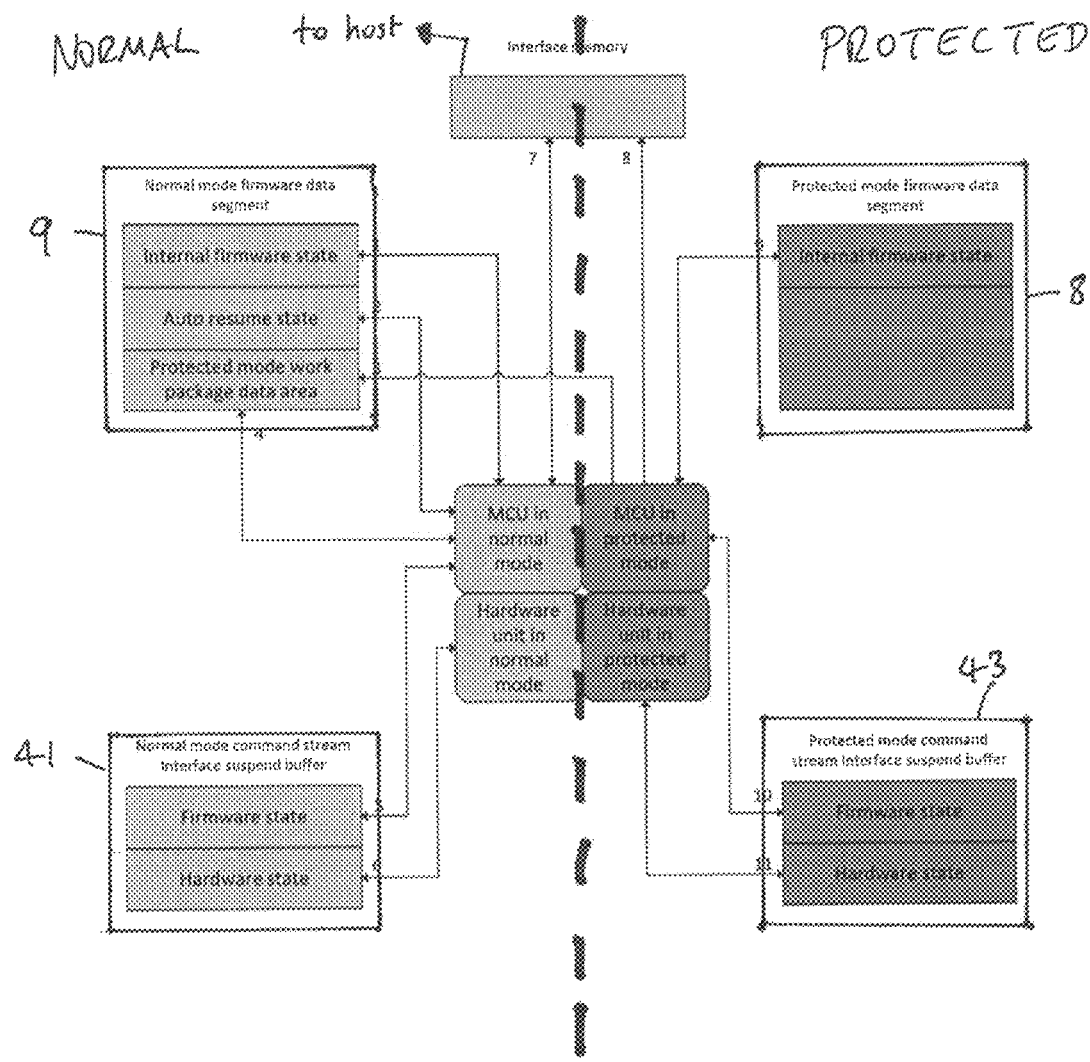
FIG. 5 shows schematically the data access in both the normal and protected modes.

FIG. 5 shows in more detail the memory access in both the normal and protected operating modes. For instance, as shown, the MCU 25 can execute inside the protected mode when the GPU 5 is in protected mode. This allows the MCU 25 visibility of the internal state of the GPU 5 in protected mode, but restricts communication from the microcontroller 25 to the host processor 2. Communication from the host processor 2 to the MCU 25 through the interface memory is still possible though, so the host processor 2 can still submit requests to the MCU 25 (e.g. change priority of command streams and force the protected mode execution to be suspended). In the protected mode, the MCU 25 is able to write to the protected memory. The MCU 25, and the hardware, is also able to write its internal state to a protected mode suspend buffer 43. The MCU 25 can also read from the non-protected memory regions, e.g. to extract the protected mode work packages 42.

When operating in the normal mode, the MCU 25 does not have access to the protected mode suspend buffer 43 or the protected memory 8. The MCU 25, and hardware, can however now write its internal state to the normal mode suspend buffer 41 (which is separate to the protected mode suspend buffer 43 to prevent any leakage between the two modes). In the normal mode, the MCU 25 is also able to create the protected mode work packages 43 and write these to the non-protected memory 9 ready for access in the protected mode.

It will be appreciated that while the GPU is operating in protected mode the host processor (CPU) can continue to work with the interface memory 44 to communicate with the GPU. Thus the host is able to enqueue more work, change command stream priority or other settings. The GPU will typically not act on (respond to) any host request until normal mode operation resumes. However, there may be exceptions to this, and in some cases it may be desired to allow the GPU to react to host updates while in protected mode.

Status reporting during the protected mode is very limited. A hardware register is implemented that can be written by the MCU in protected mode, but the read value of the register is only updated by a GPU reset (alternatively host CPU access to the register may be blocked while the GPU is in protected mode).

The protected mode instruction causes a protected mode execution required flag to be set and an interrupt request line (IRQ) signal to be sent to the host processor 2 so that the host processor 2 can then request/allow the switch into protected mode. That is, in embodiments, the host processor 2 controls when the protected mode execution is allowed. However, it is also contemplated that the switch may be fully automatic, e.g. so that the GPU 5 automatically switches into protected mode when executing a protected mode instruction (e.g. without requiring the host processor 2 to respond to an IRQ for the GPU 5 to switch into protected mode). This may help to prevent potential bubbles in the GPU 5 execution due to relatively long IRQ latencies on the host processor 2. On the other hand, by allowing the host processor 2 to control the switching, it may be possible to have the host processor 2 queue multiple protected jobs for processing at the same time, and thereby reduce the number of switching instances.

The switch back to normal mode happens automatically when all command streams with pending protected instruction regions have completed their protected instruction regions. Thus, there is no need for the host to respond to IRQs for the GPU 5 to switch back to normal mode. Again, this can help prevent bubbles in the GPU 5 execution that may otherwise occur due to IRQ latencies on the host processor 2.

In the present embodiment, the switch back to normal mode can also happen (and automatically (without requiring host intervention)) due to host requests that interrupt protected mode work and/or failures from the protected work packages.

An example of the overall flow for protected processing of protected content (e.g. DRM protected video) according to an embodiment will now be described.

First, the user mode driver requests the submission of a protected job. The driver then enqueues protected work in the ring buffer and a suitable instruction (e.g. a PROT_REGION instruction) identifying a protected sequence of commands, as well as the instructions that are to be executed in protected mode, are added into the ring buffer of a command stream interface.

Figure 6:
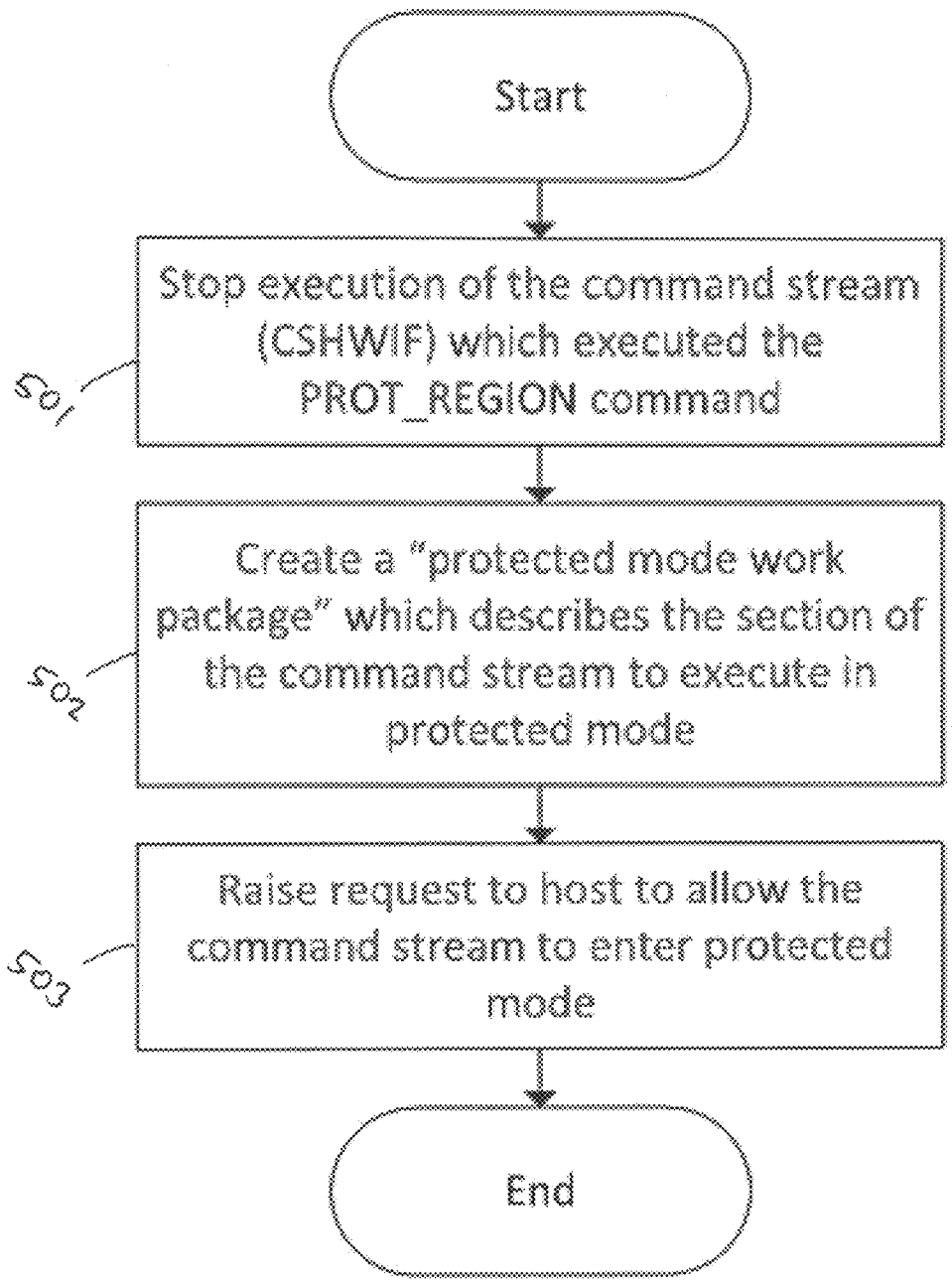
FIG. 6 is a flowchart illustrating how a protected mode request can be handled in embodiments of the technology described herein.

When the command stream reaches the PROT_REGION instruction, the PROT_REGION instruction is then emulated by the MCU 25. A protected mode execution "package" is prepared by the MCU 25 and stored for protected mode execution and the host CPU kernel driver is signalled through the command stream interface that there is pending protected mode execution. The command stream is then halted. This is illustrated in FIG. 6. As shown in FIG. 6, in step 501, when a protected region command is executed within a command stream, that command stream is stopped. A protected mode work package is then created in step 502 that describes the section of the command stream to be executed in protected mode. A request to the host is then raised to allow the command stream to enter the protected mode (step 503).

The host CPU kernel driver then decides that protected mode work should go ahead. A tag can then be updated for each individual stream to execute in protected mode and a global request is made for protected mode execution.

Figure 7:
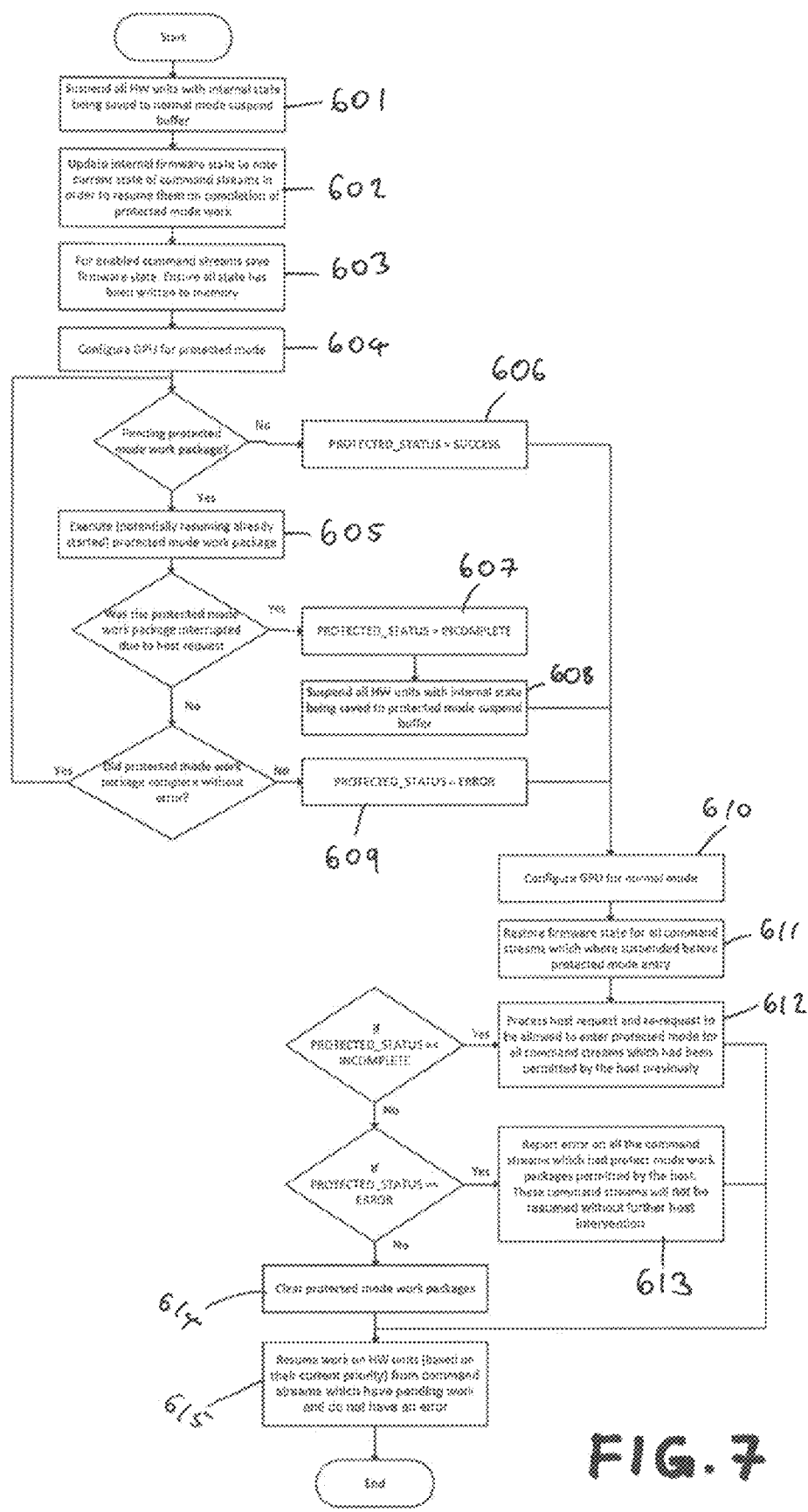
FIG. 7 is a flowchart illustrating an example of how the protected mode may be executed in embodiments of the technology described herein.

FIG. 7 illustrates an example of the protected mode execution. Once a request has been processed, the MCU 25 then suspends all command streams (step 601) and saves the internal states to a normal mode suspend buffer. The internal firmware state can then be updated to note the current state of the command streams so that they can then be resumed on completion of protected work mode (step 602). For any enabled command streams, the firmware state can then be saved, ensuring that all state has been written to memory (step 603). The GPU can then be configured for and switched into protected mode (step 604).

(If necessary, the coherency mode can be changed. For instance, when the current coherency mode is different, then the value provided in a 'protected mode coherency register' can be copied to the 'coherency enable' register (the old value is saved and will be used as the 'coherency enable' for returning to normal mode) and a reboot is performed through a soft reset command. If the coherency mode was changed for protected mode, then the 'coherency enable register' is set up to the value to use when returning from protected mode. A 'set protected mode' command can then be issued to enter protected mode.)

The MCU discovers pending protected execution packages. All pending execution packages are executed. If a protected mode work package is marked for resume then its protected mode suspend buffer will be read. On the other hand, when the command stream is marked as failed then it will be ignored. If the command stream is not marked as failed it will be resumed using state from the protected mode suspend buffer. Thus, when operating in the protected mode, when there are any pending protected work mode packages, these can then be executed (step 605) (which can potentially comprise resuming an already started protected work mode package). Otherwise, when there are no pending protected work mode packages, the status is set to SUCCESS (step 606) and the GPU can then be (re)configured for normal mode (step 610).

For any protected work mode packages being executed where the processing is interrupted due to a host request, the protected status is set to INCOMPLETE (step 607), and all hardware units are then suspended with the internal states being saved to the protected mode suspend buffer (step 608) before the GPU is (re)configured for normal mode (step 610).

For any protected work mode packages being executed where the processing does not complete, the status may be set to ERROR (step 609) and the GPU then (re)configured for normal mode (step 610).

Otherwise, when the processing completes without error, the MCU may then look for further pending protected mode work packages, and then proceed to process these.

Accordingly, protected mode processing may stop due either due to: (i) all protected mode execution packets having complete successfully, in which case the protected status bit is set to SUCCESS; or (ii) one or more protected mode execution packets having failed, or execution being interrupted by a request from the host, in which case either an ERROR or INCOMPLETE status may be returned.

At step 610, the MCU then triggers a soft reset to exit protected mode and reboot in normal mode. The status can then be updated on each command stream.

If protected mode execution completed successfully, the protected mode packages are then cleared (step 614) (so they are not re-issued) and the protected region instruction (and the protected mode instructions) are considered complete, and the command streams are automatically resumed in the normal operating mode (step 615).

On the other hand, when the protected mode execution was interrupted by a host request, so that an INCOMPLETE status was returned, the host request is then processed and a re-request is made to enter the protected mode for all (e.g. suspended) command streams which had not been previously been permitted by the host processor (step 612). Once this has been done, work may be resumed for any commands streams with pending work and no error (step 615).

For any cases where the protected mode execution failed, so that an ERROR status was reported, the error is then reported for all command streams which had been processing work, and these command streams will not be resumed without further host intervention (step 613).

In the example above, the status reporting in the protected mode is limited to SUCCESS/ERROR/INCOMPLETE. However, in some cases, the status reporting may be further limited to SUCCESS/ERROR. In that case, an ERROR status may mean either that the processing of one or more protected mode work packages did not complete, or that there was a request from the host which pre-empted their processing. Thus, it may be necessary to check to see when there are any pending host requests which would have pre-empted protected mode processing, and to then check each command stream interface to see when it had a protected execution package. If it did, and when there are no pending host requests which would have pre-empted protected mode processing, an error is signalled on the command stream interface and its protected mode work package is cleared. However, when there were any pending host requests which would have pre-empted protected mode processing, then it is unclear when the package has an error or was simply suspended and so the work package may be updated to indicate a resume is required and the work package may be made available again for protected mode processing.

Also, although in the example above the switching is controlled by the host processor, it is also contemplated that the MCU 25 may take the decision itself on when to switch into protected mode. This may be performed automatically, i.e. as and when a protected region instructed in executed, or the MCU 25 may wait and schedule the protected processing as desired.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system, the data processing system comprising:

a host processor that executes applications using an operating system;

an accelerator operable to process data for applications executing on the host processor; and memory for storing data for use by the accelerator, the memory having both protected memory and non-protected memory;

wherein the accelerator can be switched between a non-protected mode of operation for processing non-protected content and a protected mode of operation for processing protected content;

wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and wherein the command stream generating circuitry is operable to include within a command for a command stream an indication that a subsequent sequence of one or more command(s) within that command stream is to be implemented by the accelerator in a protected mode of operation so that when that command is executed the accelerator is operable to initiate or request a switch into the protected mode of operation for processing the subsequent sequence of one or more command(s), wherein when a command including an indication that a subsequent sequence of one or more command(s) are to be implemented by the accelerator in a protected mode of operation is executed, the accelerator stops execution of at least the command stream including that command, and creates a protected mode work package describing the section of the command stream to be executed in protected mode, wherein the protected mode work package is written to non-protected memory.

2. The data processing system of claim 1, wherein when a command including an indication that a subsequent sequence of one or more command(s) are to be implemented by the accelerator in a protected mode of operation is executed, the accelerator signals to the host processor that a switch into a protected mode of operation is desired, and the host processor then causes the accelerator to switch into the protected mode of operation.

3. The data processing system of claim 1, wherein when a command including an indication that a subsequent sequence of one or more command(s) are to be implemented by the accelerator in a protected mode of operation is executed, the accelerator switches into the protected mode of operation without intervention from the host processor.

4. The data processing system of claim 1, wherein when the accelerator is switched into the protected mode, the accelerator is able to read the protected mode work package (s) stored in the non-protected memory to identify the work to be performed in the protected mode, and to then perform the work whilst in the protected mode.

5. The data processing system of claim 1, wherein when the accelerator is operating in the protected mode, the accelerator is operable to report a success status when all of the work scheduled to be processed in the protected mode is complete, and to report a failure status when any of the scheduled protected work did not successfully complete.

6. The data processing system of claim 5, wherein the accelerator is operable to report a suspended status when the processing of any of the protected work is interrupted due to a request from the host processor.

7. The data processing system of claim 1, wherein the accelerator is capable of automatically switching out of the protected mode when all protected processing work has been successfully completed.

8. The data processing system of claim 1, wherein when the accelerator is operating in the protected mode, the host processor is able to interrupt the protected processing and cause the accelerator to switch back into the normal mode of operation.

9. The data processing system of claim 8, wherein in the event that the protected processing is interrupted due to a request from the host processor, the protected processing is suspended and the current state is saved to a suspend buffer for the protected mode.

10. An accelerator for use within a data processing system as claimed in claim 1, the accelerator comprising command stream executing circuitry comprising:
one or more command stream interface(s) to which respective command streams can be assigned; and
a command stream execution unit for implementing commands in command stream(s) assigned to the command stream interface(s);
wherein when a command stream generated by a host processor is to be executed by the accelerator, the command stream is assigned to a respective command stream interface, and the sequence of commands within the command stream is then executed by the command stream execution unit, wherein in response to the command stream execution unit executing a command indicating that a subsequent sequence of one or more command(s) is to be implemented by the accelerator in a protected mode of operation, the accelerator then switches or requests a switch into the protected mode of operation,
wherein when a command including an indication that a subsequent sequence of one or more command(s) are to be implemented by the accelerator in a protected mode of operation is executed, the accelerator stops execution of at least the command stream including that command, and creates a protected mode work package describing the section of the command stream to be executed in protected mode, wherein the protected mode work package is written to non-protected memory.

11. A method of processing data using a data processing system comprising:
a host processor that executes applications using an operating system;
an accelerator operable to process data for applications executing on the host processor; and
memory for storing data for use by the accelerator, the memory having both protected memory and non-protected memory;
wherein the accelerator can be switched between a non-protected mode of operation for processing non-protected content and a protected mode of operation for processing protected content;
wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator;
the method comprising:
when a request for processing includes protected content, including within a command for a command stream an indication that a subsequent sequence of one or more command(s) within that command stream associated with the protected content is to be implemented by the accelerator in a protected mode of operation; and
when that command is executed by the accelerator, initiating or requesting a switch into the protected mode of operation,
wherein when the command indicating that a subsequent sequence of one or more command(s) are to be implemented by the accelerator in a protected mode of operation is executed, the execution of at least the command stream including that command is stopped, and protected mode work package describing the section of the command stream to be executed in protected mode is created and written to non-protected memory.

12. The method of claim 11, wherein when the indicating that a subsequent sequence of one or more command(s) are to be implemented by the accelerator in a protected mode of operation is executed, the accelerator signals to the host processor that a switch into a protected mode of operation is desired, and the host processor then causes the accelerator to switch into the protected mode of operation.

13. The method of claim 11, wherein when the indicating that a subsequent sequence of one or more command(s) are to be implemented by the accelerator in a protected mode of operation is executed, the accelerator automatically switches into the protected mode of operation.

14. The method of claim 11, wherein when the accelerator is switched into the protected mode, the accelerator reads the protected mode work package(s) stored in the non-protected memory to identify the work to be performed in the protected mode, and then performs the identified work whilst in the protected mode.

15. The method of claim 11, comprising: (i) reporting a success status when all of the work scheduled to be processed in the protected mode is complete; (ii) reporting a failure status when any of the scheduled protected work did not successfully complete; or (iii) reporting a suspended status when the processing of any of the protected work is interrupted due to a request from the host processor.

16. The method of claim 11, comprising automatically switching out of the protected mode when all protected processing work has been successfully completed.

17. A computer readable storage medium storing software code that when executed on a data processor performs a method of processing data in a data processing system that comprises a host processor that executes applications using an operating system; an accelerator operable to process data for applications executing on the host processor; and memory for storing data for use by the accelerator, the memory having both protected memory and non-protected memory;
wherein the accelerator can be switched between a non-protected mode of operation for processing non-protected content and a protected mode of operation for processing protected content;
wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator;

the method comprising:

when a request for processing includes protected content, including within a command for a command stream an indication that a subsequent sequence of one or more command(s) within that command stream associated with the protected content is to be implemented by the accelerator in a protected mode of operation; and when that command is executed by the accelerator, initiating or requesting a switch into the protected mode of operation, wherein when a command including an indication that a subsequent sequence of one or more command(s) are to be implemented by the accelerator in a protected mode of operation is executed, the accelerator stops execution of at least the command stream including that command, and creates a protected mode work package describing the section of the command stream to be executed in protected mode, wherein the protected mode work package is written to non-protected memory.

* * * * *